United States Patent
Honda

[19]

[11] Patent Number: 6,010,151
[45] Date of Patent: Jan. 4, 2000

[54] INFLATABLE SEAT BELT CONTROL SYSTEM

[75] Inventor: Kiyoshi Honda, Wako, Japan

[73] Assignee: Honda Giken Kogyo Kabushiki Kaisha, Tokyo, Japan

[21] Appl. No.: 08/961,152

[22] Filed: Oct. 30, 1997

[30] Foreign Application Priority Data

Nov. 1, 1996 [JP] Japan .................................. 8-291976

[51] Int. Cl.⁷ ............................ B60R 21/18; B60R 21/32
[52] U.S. Cl. ............................................ 280/733; 280/735
[58] Field of Search ................................... 280/733, 735; 180/268

[56] References Cited

U.S. PATENT DOCUMENTS

| | | | |
|---|---|---|---|
| 3,874,694 | 4/1975 | Stephenson | 280/733 |
| 5,303,953 | 4/1994 | Kamiyama et al. | 280/733 |
| 5,413,378 | 5/1995 | Steffens, Jr. et al. | 280/735 |
| 5,454,591 | 10/1995 | Mazur et al. | 280/735 |

*Primary Examiner*—Peter C. English
*Attorney, Agent, or Firm*—Armstrong, Westerman, Hattori, McLeland & Naughton

[57] ABSTRACT

An occupant holding-back device is provided which is capable of preventing unnecessary operations. When the amount of a webbing drawn from a retractor is any one of equal to and larger than a predetermined value and a tongue mounted on the webbing is coupled to a buckle, an ignition control member is brought into a stand-by state. If an acceleration sensor detects an acceleration which is any one of equal to and larger than a predetermined value, an inflator is ignited, causing a bag accommodated in the webbing to be expanded. When the occupant holding-back device is not being worn by an occupant, or when the occupant holding-back device is utilized for fixing a child seat, the ignition of the inflator is prohibited. Hence, unnecessary operations of the occupant holding-back device is prevented.

1 Claim, 7 Drawing Sheets

INFLATABLE SEAT BELT CONTROL SYSTEM

TECHNICAL FIELD OF THE INVENTION

The present invention relates to an occupant holding-back device which includes an expandable bag accommodated on a belt for holding back or restraining an occupant upon collision of a vehicle.

DESCRIPTION OF THE RELATED ART

An occupant holding-back device is conventionally known, for example, as disclosed in Japanese Patent Application Laid-open No.6-262996 (JP '996).

The occupant holding-back device disclosed in JP '996 is adapted to ignite the inflator in response to an output from an acceleration sensor. The occupant holding-back device of JP '996 suffers from the problem as follows. When the acceleration sensor detects an acceleration equal to or larger than a predetermined value, the inflator is ignited regardless of whether the occupant holding-back device is being worn by an occupant. For example, the occupant holding-back device on the assistant driver's seat is operated, despite no occupant being on the assistant driver's seat. Since the replacement of the occupant holding-back device is expensive, this is undesirable.

SUMMARY OF THE INVENTION

The present invention has been accomplished with the above circumstance in view, and it is an object of the present invention to prevent an unnecessary operation of the occupant holding-back device.

According to the present invention, when the amount of webbing drawn from a retractor is any one of equal to and larger than a predetermined value with the occupant holding-back device being worn by an occupant, and the tongue is coupled to the buckle, the ignition control unit permits the ignition of the inflator. Therefore, if the acceleration sensor detects the collision of the vehicle in such a state, the inflator is ignited to expand the bag. When the occupant does not wear the occupant holding-back device, the tongue is not coupled to the buckle, and when the occupant holding-back device is utilized for fixing a child seat, the amount of webbing drawn from the retractor is smaller than the predetermined value and hence, the ignition control unit does not permit the ignition of the inflator. Therefore, even if the acceleration sensor detects the collision of the vehicle in this state, the bag cannot be expanded.

The predetermined value is defined as being smaller than an amount of webbing drawn, required for coupling the tongue to the buckle in a state in which the occupant is on the seat, and as being larger than an amount of webbing drawn when the child seat is fixed utilizing the occupant holding-back device.

BRIEF DESCRIPTION OF THE DRAWING FIGURES

DETAILED DESCRIPTION OF THE INVENTION

The mode for carrying out the present invention will now be described by way of an embodiment shown in the accompanying drawings.

Figure 1:
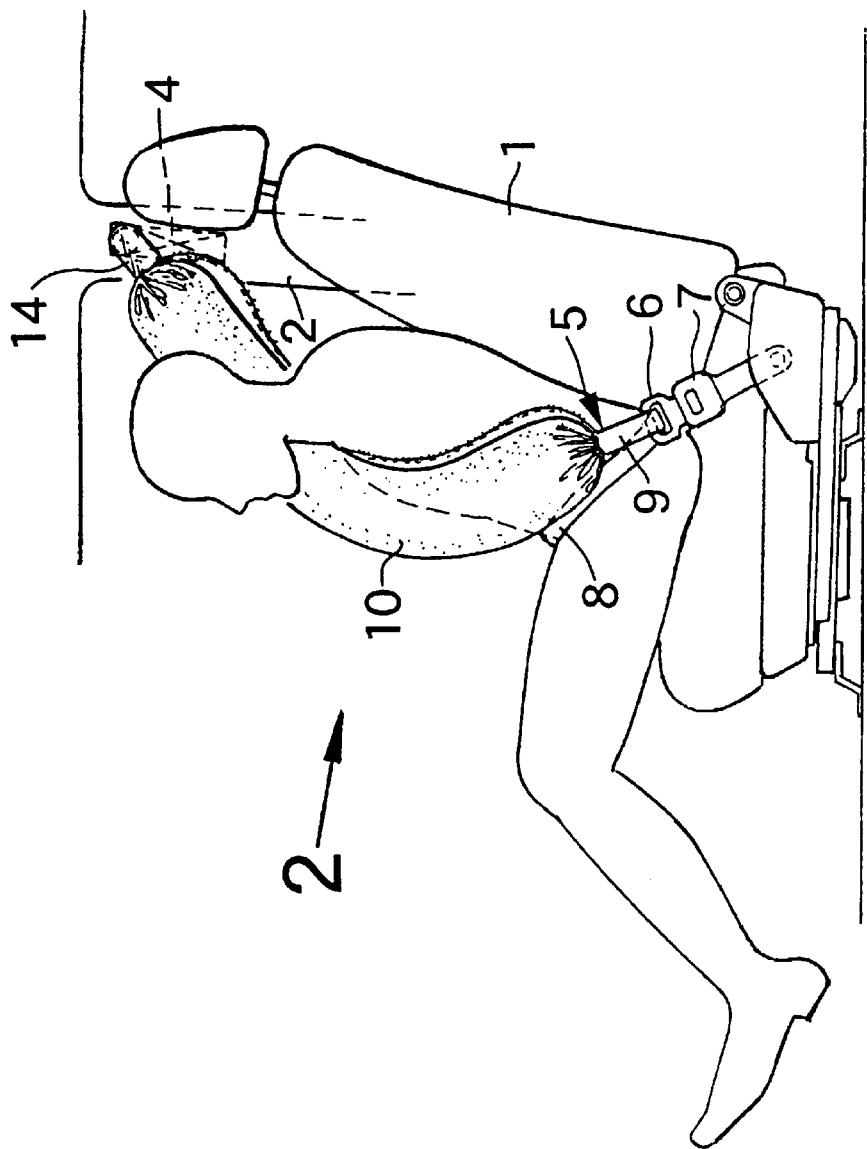
FIG. 1 is a side view of a front seat in a vehicle.
Figure 2:
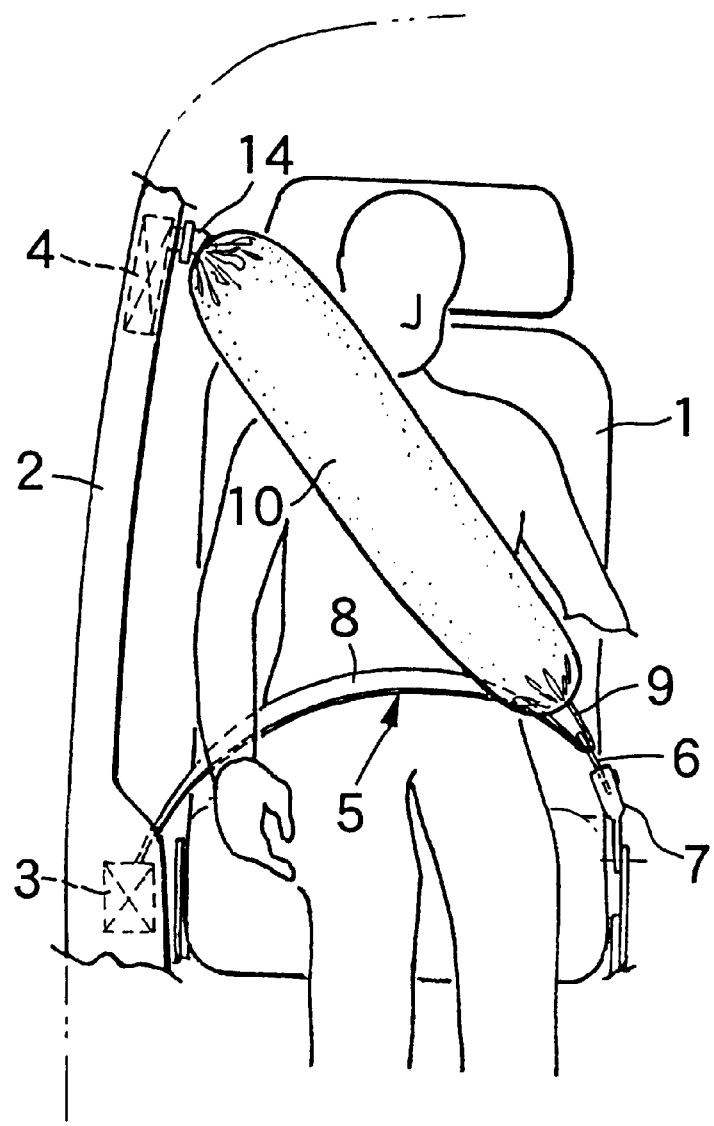
FIG. 2 is a view taken in the direction of arrow 2 shown in FIG. 1.
Figure 3:
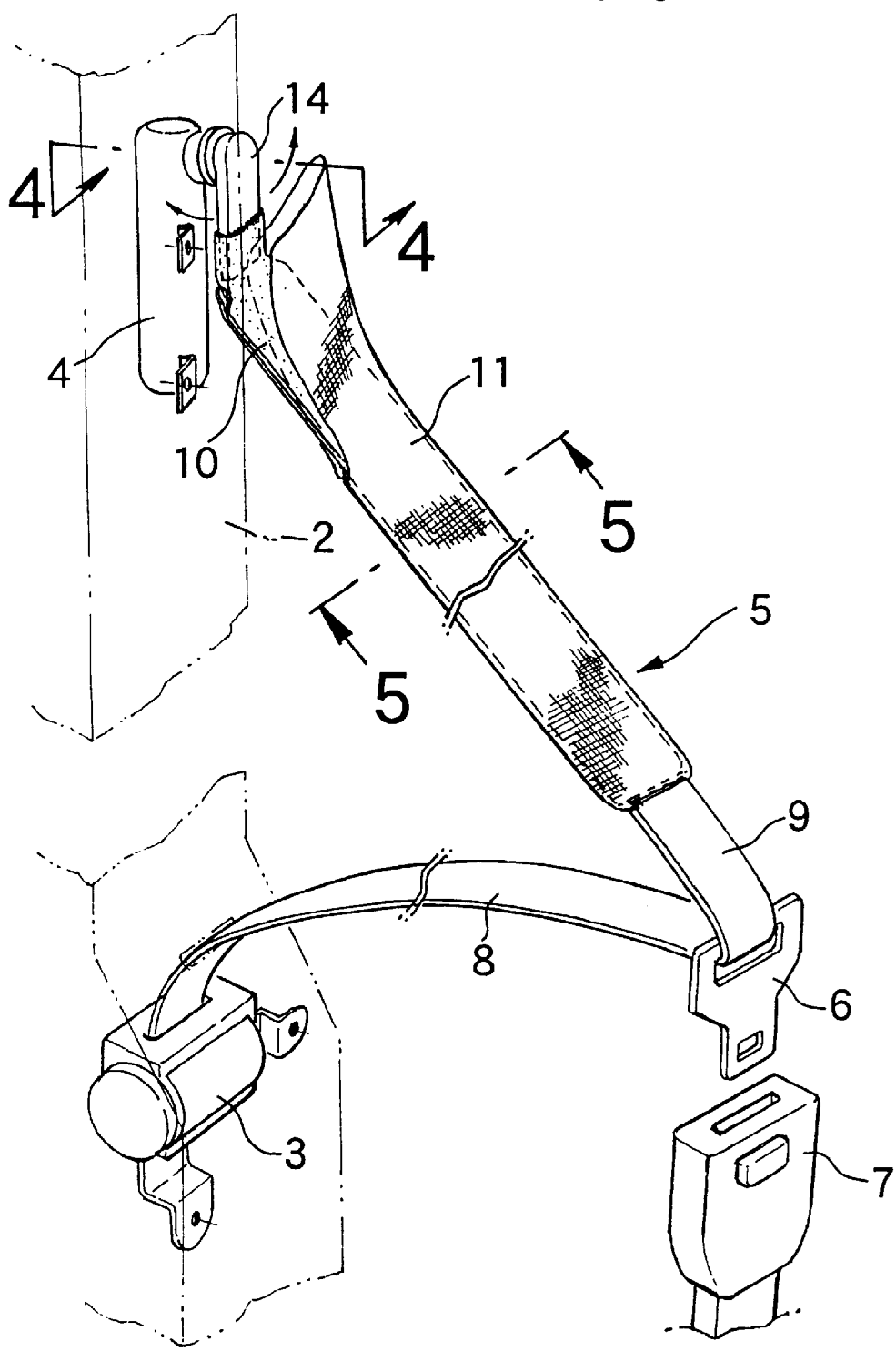
FIG. 3 is a perspective view of the occupant holding-back device according to an embodiment of the present invention.

As shown in FIGS. 1 to 3, an occupant holding-back device for holding back an occupant in a seat 1 includes a retractor 3 mounted at a lower portion of a center pillar 2, an inflator 4 mounted at an upper portion of the center pillar 2, a webbing 5 supported at its opposite ends on the retractor 3 and the inflator 4, respectively, a tongue 6 slidably carried at an intermediate portion of the webbing 5, and a buckle 7 which is mounted at a frame portion of the seat 1 and to which the tongue 6 is detachably coupled.

The retractor 3, which is known, drawably takes up one end of the webbing 5. The retractor 3 is designed, so that in a usual state in which a mechanical acceleration sensor does not detect an acceleration equal to or larger than a predetermined value, the webbing 5 is drawable from the retractor 3 to permit the movement of an occupant body. When the mechanical acceleration sensor has detected an acceleration equal to or larger than the predetermined value upon collision of a vehicle, the webbing 5 is non-drawably locked to hold back the occupant. The known inflator 4 is adapted to be ignited to produce a high-pressure gas by combustion of a propellant, when the acceleration sensor has detected an acceleration equal to or larger than the predetermined value.

Figure 4:
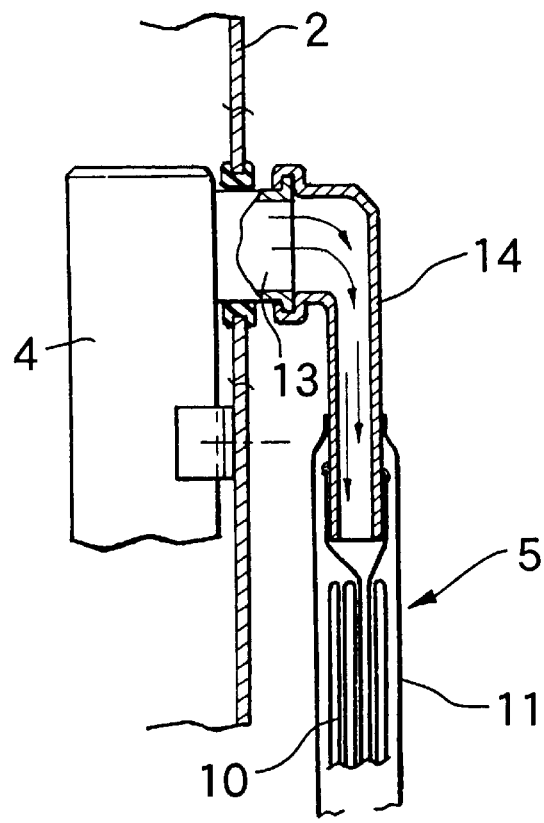
FIG. 4 is an enlarged cross-sectional view taken along a line 4—4 of FIG. 3.
Figure 5:
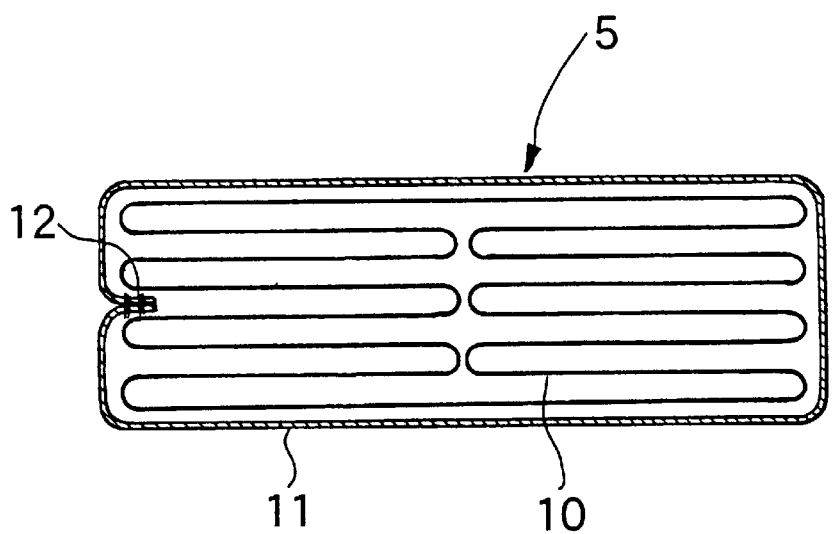
FIG. 5 is an enlarged cross-sectional view taken along a line 5—5 of FIG. 3.

The webbing 5 is comprised of a lap belt 8 extending between the retractor 3 and the tongue 6, and a shoulder belt 9 integrally connected to the lap belt 8 and extending between the tongue 6 and the inflator 4. The lap belt 8 is comprised of a plain weave belt made of a usual synthetic fiber, but the shoulder belt 9 is comprised of a folded bag 10, and a cover 11 which covers the outside of the bag 10, as shown in FIGS. 3 to 5. The cover 11 is sewn at a seam portion 12 (see FIG. 5) extending in a lengthwise direction of the shoulder belt 9. A shoulder anchor 14 is rotatably supported at a gas outlet 13 of the inflator 4 mounted at the upper portion of the center pillar 2. The hollow shoulder anchor 14 also serves as a gas passage, and the bag 10 and the cover 11 are fixed at their upper ends to a lower end of the shoulder anchor 14. FIG. 5 shows the thickness-wise dimension of the shoulder belt 9 in an enlarged scale, and the actual thickness of the shoulder belt 9 is smaller than the thickness shown in FIG. 5.

Figure 6:
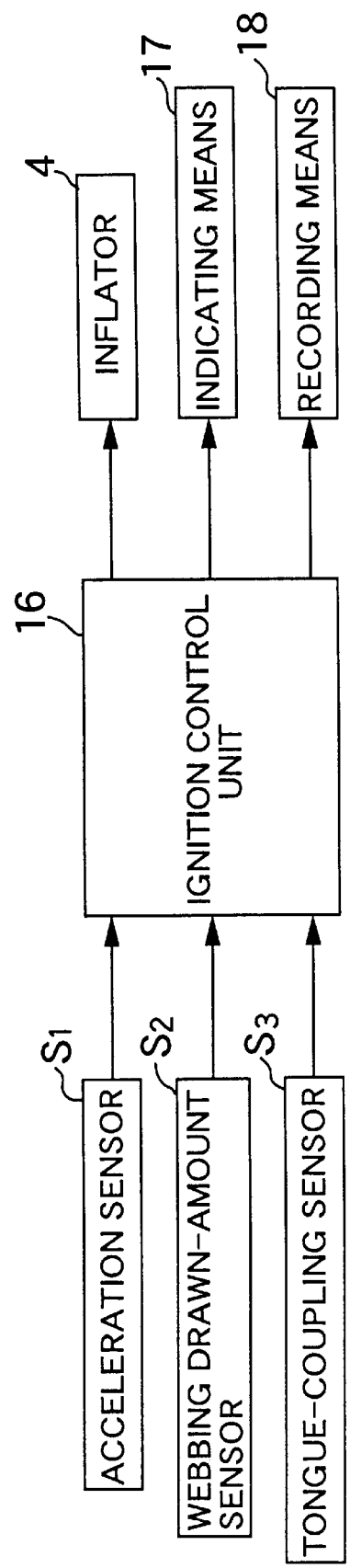
FIG. 6 is a block diagram of a control system.

Referring to FIG. 6, an ignition control unit 16 comprised of a microcomputer is shown. A signal from an acceleration sensor $S_1$ for detecting an acceleration of the vehicle, a signal from a webbing drawn-amount sensor $S_2$ mounted on the retractor 3 for detecting an amount of webbing 5 drawn from the retractor 3, and a signal from a tongue-coupling sensor $S_3$ mounted on the buckle 7 for detecting the coupling of the tongue 6 to the buckle 7 are all inputted to the ignition control unit 16. The inflator 4, an indicating means 17 and a recording means 18 are connected to the ignition control unit 16, so that the operations thereof are controlled based on the signals from the sensors $S_1$, $S_2$ and $S_3$.

Figure 7:
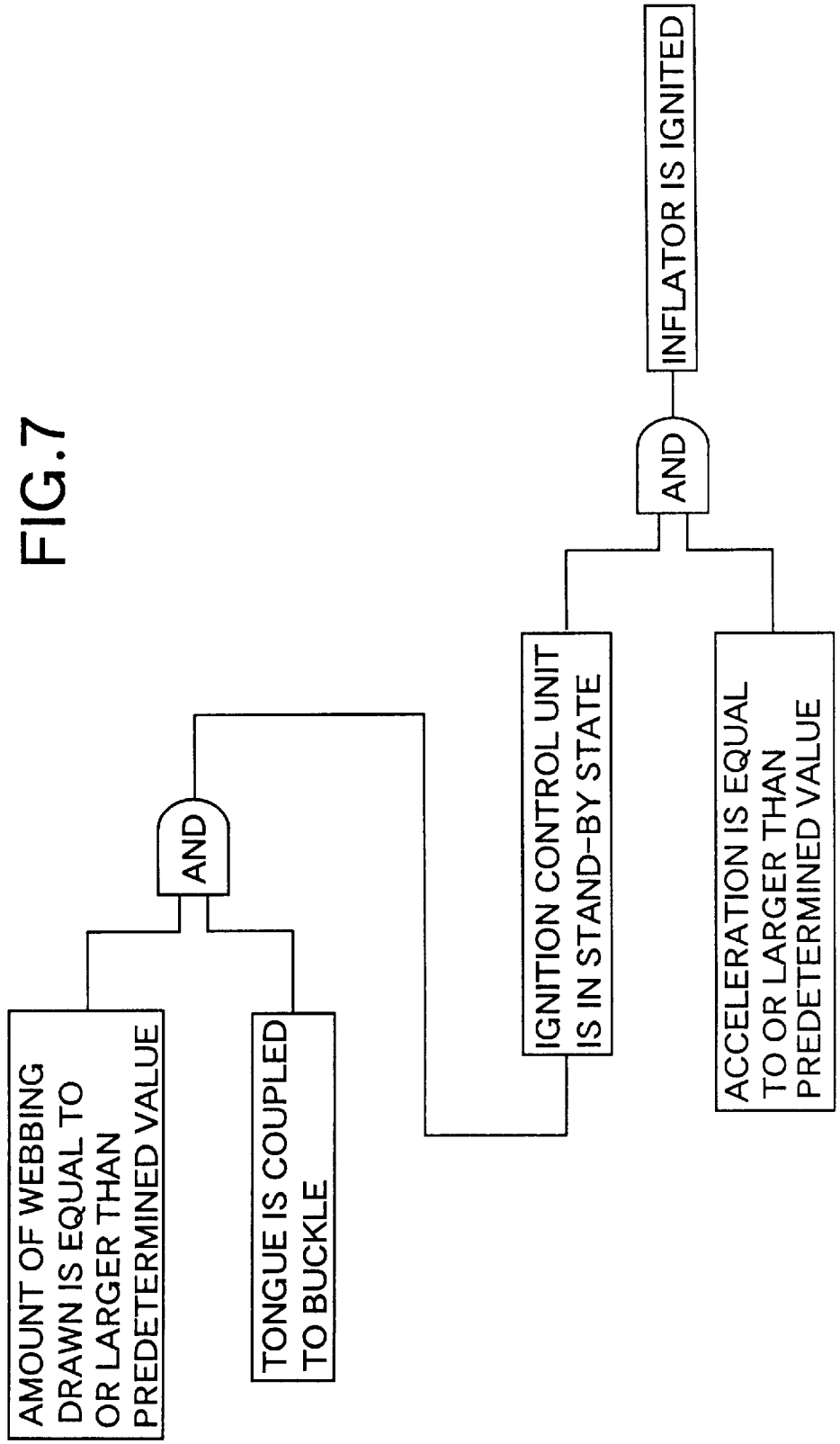
FIG. 7 is a diagram illustrating a logic for controlling the ignition of an inflator.
Figure 8:
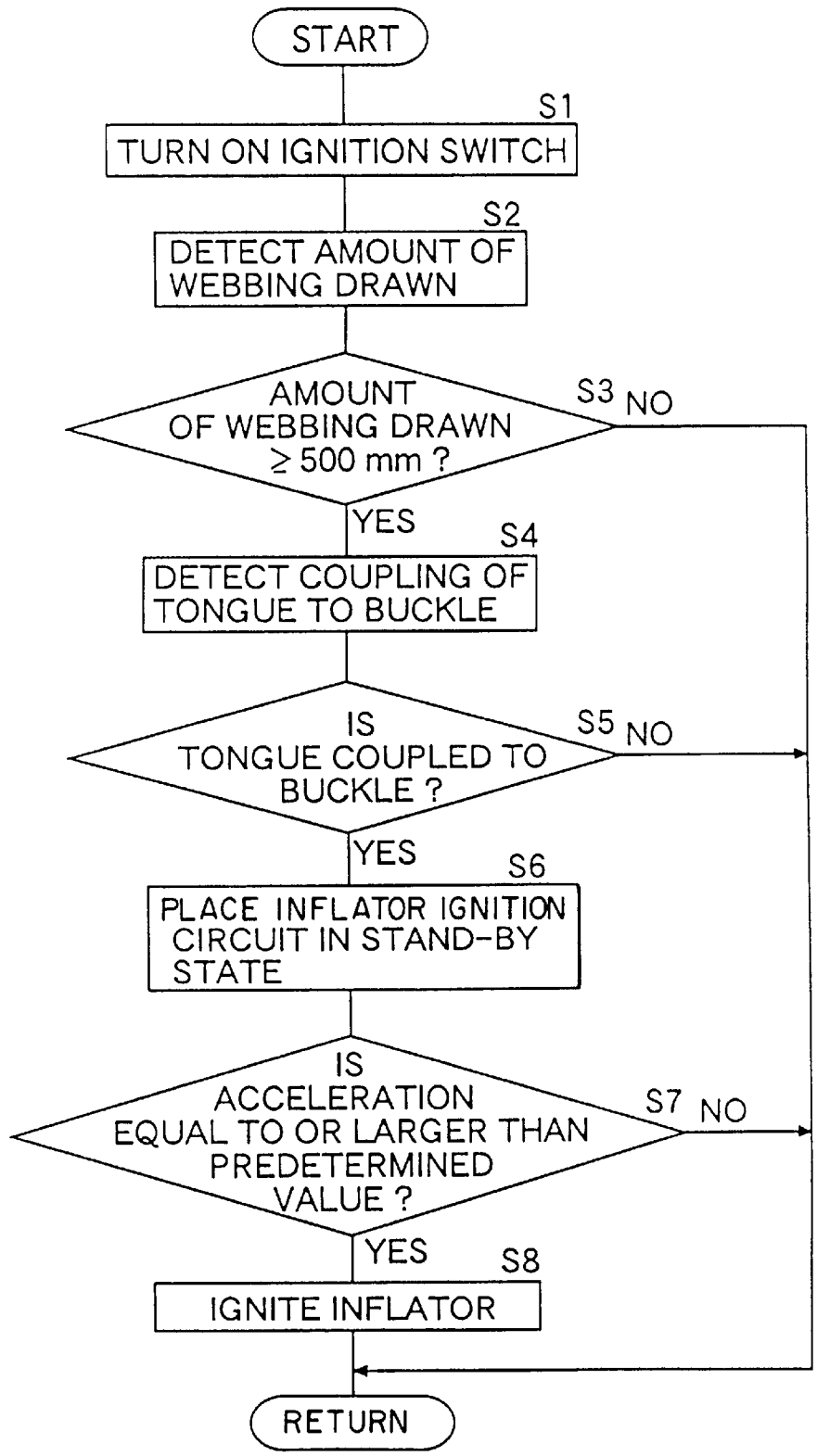
FIG. 8 is a float chart for controlling the ignition of an inflator.

The operation of the embodiment of the present invention having the above-described arrangement will be described with reference to the block diagram in FIG. 7 and the flow chart in FIG. 8.

First, when an ignition switch is turned ON at step S1, an electric current is supplied to the ignition control unit 16. At subsequent step S2, an amount of webbing 5 drawn from the retractor 3 is detected by the webbing-drawm amount sensor $S_2$, and at step S3, the amount of webbing 5 drawn is compared with a predetermined value (e.g., 500 mm). If the amount of webbing 5 drawn is equal to or larger than the predetermined value, the processing is advanced to step S4. The predetermined value is set so that it is smaller than an amount of webbing drawn, required for coupling the tongue 6 to the buckle 7 in a state in which the occupant is on the seat 1, and so that it is larger than an amount of webbing drawn, when a child seat is fixed to the seat 1 utilizing the occupant holding-back device. At the next step S5, the coupling of the tongue 6 to the buckle 7 is detected by the tongue-coupling sensor $S_3$. If the tongue 6 has been coupled to the buckle 7, the processing is shifted to step S6, at which the ignition control unit 16 is brought into a stand-by state.

The stand-by state means a state in which the inflator 4 is ignited when the acceleration sensor $S_1$ detects an acceleration equal to or larger than a predetermined value due to the collision of the vehicle. If the ignition control unit 16 is in a non-stand-by state, the inflator 4 is not ignited even if the acceleration sensor $S_1$ has detected an acceleration equal to or larger than the predetermined value. In this way, the inflator 4 is ignited under a necessary condition that the mount of webbing 5 drawn is equal to or larger than the predetermined value and the tongue 6 has been coupled to the buckle 7. Therefore, when the occupant holding-back device is not worn by the occupant, or when the occupant holding-back device is utilized for fixing the child seat, the inflator 4 cannot be ignited. Thus, the occupant holding-back device is reliably prevented from performing an unnecessary operation. Whether the occupant holding-back device is in the stand-by state or the non-stand-by state is indicated to the occupant by the indicating means 17 connected to the ignition control unit 16 and the stand-by or non-stand-by state is also recorded in the recording means 18.

If the acceleration sensor $S_1$ detects an acceleration equal to or larger than the predetermined value due to the collision of the vehicle at step S7 when the ignition control unit 16 is in the stand-by state at step S6, the inflator 4 is ignited by a command from the ignition control device 16 at step S8 to produce a high-pressure gas. When the high pressure gas that has been produced is supplied to a bag 10 accommodated in the webbing 5, the bag 10 is expanded by the pressure of the high-pressure gas in such a manner that it breaks the seam portion 12 of the cover 11, thereby holding back the breast of the occupant. The expanded bag 10 can hold back the occupant more gently than a conventional seat belt, because the expanded bag 10 has a larger area of contact with the occupant, than does the conventional seat belt.

Although the embodiment of the present invention has been described in detail, it will be understood that the present invention is not limited to the above-described embodiment, and various modifications may be made without departing from the spirit and scope of the invention defined in the claims.

For example, if a vehicle sensor for detecting a vehicle speed is connected to the ignition control unit 16 and the ignition control unit 16 is brought into the stand-by state, when the amount of webbing 5 drawn is equal to or larger than the predetermined value, the tongue 6 has been coupled to the buckle 7 and the vehicle speed is equal to or larger than a predetermined value, the expansion of the bag 10 can be prohibited during traveling of the vehicle at a low speed wherein the bag 10 need not be expanded.

As discussed above, according to the present invention, when the amount of webbing drawn from the retractor is equal to or larger than the predetermined value and the tongue has been coupled to the buckle, the ignition control unit permits the ignition of the inflator. Thus, only when the occupant has worn the occupant holding-back device, can the belt be expanded. Therefore, when the occupant does not wear the occupant holding-back device and when the occupant holding-back device is utilized for fixing a child seat, the bag cannot be wastefully expanded.

What is claimed is:

1. An occupant holding-back device comprising:

a webbing;

an inflator connected to said webbing;

a retractor attached to one of opposite ends of said webbing for drawably taking up at least said one end of said webbing;

a tongue mounted at an intermediate portion of said webbing between said opposite ends;

a buckle to be attached with said tongue;

an inflatable bag accommodated in said webbing;

a webbing drawn-amount sensor for detecting an amount of said webbing drawn out of said retractor;

a tongue-coupling sensor for detecting a coupled state of said tongue to said buckle; and an ignition control unit for igniting said inflator based on outputs from an acceleration sensor, said webbing drawn-amount sensor and said tongue-coupling sensor;

wherein said ignition control unit ignites said inflator and expands said bag when said webbing drawn-amount sensor detects that said webbing is drawn out from said retractor in an amount which is equal to or larger than a predetermined value and said tongue-coupling sensor detects that said tongue has been coupled to said buckle.

* * * * *